WIRE PRINTER

Filed Dec. 31, 1954 8 Sheets-Sheet 1

INVENTORS
H. A. JURGENS
M. J. KELLY

BY

Joseph B. Taphorn
ATTORNEY

INVENTORS
H. A. JURGENS
M. J. KELLY

BY

Joseph B. Tapham
ATTORNEY

WIRE PRINTER

Filed Dec. 31, 1954 8 Sheets-Sheet 3

INVENTORS
H. A. JURGENS
M. J. KELLY
BY
Joseph B. Topham
ATTORNEY

May 31, 1960 H. A. JURGENS ET AL 2,938,455

WIRE PRINTER

Filed Dec. 31, 1954 8 Sheets-Sheet 4

INVENTORS
H. A. JURGENS
M. J. KELLY

BY

Joseph B. Taphorn

ATTORNEY

INVENTORS
H.A.JURGENS
M.J.KELLY
BY
Joseph B. Raphan
ATTORNEY

May 31, 1960 H. A. JURGENS ET AL 2,938,455

WIRE PRINTER

Filed Dec. 31, 1954 8 Sheets-Sheet 6

INVENTORS
H. A. JURGENS
M. J. KELLY

BY

Joseph B. Papham
ATTORNEY

INVENTORS
H. A. JURGENS
M. J. KELLY
BY
Joseph B. Raphorn
ATTORNEY

INVENTORS
H.A. JURGENS
M.J. KELLY
BY
Joseph B. Taphorn
ATTORNEY 2,938,455
Patented May 31, 1960

2,938,455

WIRE PRINTER

Henry A. Jurgens, Vestal, and Martin J. Kelly, Endicott, N.Y., assignors to International Business Machines Corporation, New York, N.Y., a corporation of New York Filed Dec. 31, 1954, Ser. No. 479,107

8 Claims. (Cl. 101—93)

This invention relates to high speed wire printers and more particularly to wire printers wherein a plurality of line spaced print heads bearing presettable wire matrices are shifted laterally of the platen between print strokes to print successively in adjacent character positions of a line. After a number of such lateral adjustments in respective sub-cycles, a complete line of print is obtained. Heretofore, the line of print heads has then been restored prior to printing of the next line in the next cycle.

A printer of this type is disclosed in the copending application, Serial No. 462,001, of Reynold B. Johnson, filed October 13, 1954, and now U.S. Patent No. 2,802,-414. As is more fully explained in that application, each print mechanism consists of a plurality of wires which are mounted in curved flexible guide tubes. At one end these tubes are fixed in a line so that the control ends of the print wires projecting therefrom may be preset, as by selective longitudinal displacement, by a code rod rotatable and translatable to any of fifty-six different character-determining positions. Each code rod is controlled by a series of six magnets A, B, C, D, E, and F which, when energized singly or in combination, act through mechanically driven contrivances to differentially position the code rod.

The other ends of the print wire guide tubes are brought together to form a cable which extends upwardly and rearwardly to form a second curve in the guide tubes. At the end of the cable, the guide tubes are fixed to a print head which is reciprocable towards a platen to effect print strokes. The particular character impressed during a print stroke is determined by the selective longitudinal displacement of the wires, and it results that those wires which project from the face of the print head strike a ribbon to record the pattern of the print wires in the print head matrix upon a form or other paper on the platen.

The main object of this invention is to provide a printer having still higher speeds than those obtainable with the type above described.

Another object of the invention is to provide a printer having less wear and tear, lower noise levels, and smaller energy expenditures than printers of the type described above.

Still another object of the invention is to provide such printers which are also accurate and reliable in operation.

A further object of the invention is to provide such printers which are also simple and easy and inexpensive of construction.

According to the invention, successive lines of print are obtained by indexing the line of spaced print heads in both directions. Thus, the time formerly required to restore a line of print heads in a cycle is eliminated. The print heads also undergo only one-half the amount of movement they formerly underwent in each cycle, thus not only reducing wear and tear and energy requirements but also the noise level which obtained in part because of the rapid lateral restoration stroke.

Another feature of the invention resides in the provision of spaced read-out from a storage device such as a continuously rotatable magnetic drum. On such a drum an information track may be provided with a capacity for many characters—in the particular embodiment disclosed, a capacity of one hundred characters or digits is contemplated. In a typical printer construction, there are provided 120 print or character positions in each line, and these may be printed in by thirty print heads each covering four positions. A plugboard is provided with one hundred and twenty printer input hubs and one hundred storage exit hubs. The printer input hubs correspond to each of the one hundred and twenty character positions on a line, whereas the one hundred storage exit hubs correspond to the one hundred digits or characters which may be spaced about the information drum track. By suitably interconnecting through plug wires the various exit hubs with the printer input hubs, any of the one hundred digits on the drum track can be delivered for printing in any of the one hundred and twenty character positions of a line, there being four input hubs for each print mechanism for inputs in as many sub-cycles. Since a particular print mechanism and print head can accommodate only one character at a time or sub-cycle, or any of four characters in any of four sub-cycles, a sub-cycle select control is provided to permit the read-out of only one of the four possible digits to each print mechanism in a sub-cycle. The sub-cycle select control, however, automatically advances in orderly sequence so that in successive sub-cycles the other of the four digits possibly plugged to input hubs of a particular print mechanism will be printed.

The storage exit hubs are successively pulsed through the control of a synchronizing drum track having one hundred equally spaced spots. The spots correspond to the different digit spaces on the information track of the drum. They are successively detected by a read head for that synchronizing track to operate a diode matrix which successively conditions the respective exit hubs for periods corresponding to the read-out time for corresponding digits on the information track.

As observed earlier, each print mechanism is controlled by six magnets. Since there may be thirty print mechanisms in a printer, there are thirty sets of six magnets each. The energization of each of these magnets is controlled through the firing of a two-grid controlled thyratron. Thus, there are thirty sets or banks of six thyratrons each, one bank for each print mechanism and print head. However, each bank of six thyratrons is accompanied by an additional thyratron. Each of these extra or seventh thyratrons is part of an individual checking system for the corresponding print mechanism and is operated on the redundant bit principle more fully disclosed in the copending application, Serial No. 478,787, of Donald K. Rex, filed December 30, 1954, and now U.S. Patent No. 2,829,593. They are fired according to whether a redundant bit accompanies the bits representative of a digit to which a print mechanism is being set up.

The printer is operated on a combinational code having bits X, 1, 2, 4, 8, and 0. Since any one or more of six bits or impulses may designate a character, and these bits or impulses may be accompanied by a redundant bit or impulse designated R, the information track on the drum is provided with seven spot or bit spaces for each digit (or character). The addresses of each of these information bits is given by a second synchronizing track on the drum on which seven hundred equally spaced spots are permanently recorded. Hence, this track has one spot for each bit space on the information track. The address of each digit (or character) is given by a corresponding one of the one hundred evenly spaced bits on the first synchronizing track.

The reading out of the information from the magnetic drum is controlled by the printer. At a fixed time in each sub-cycle, a set of cam contacts are operated to close a read-out gate in the circuit with the read head for the information track. The closing of this gate connects the read head with a coincidence bit distributor which hence receives the information serially by bit and digit. A seven stage closed bit ring, advanced by the reading of the permanent spots on the seven hundred synchronizing drum track, is continually operative to transmit pulses in proper time sequence with the reading of the bit spaces on the information drum track. It transmits separate pulses over separate lines to seven coincidence circuits in the bit distributor. Coincidence between any of these seven bit ring fed pulses and an information bit results in a conditioning of one grid of a corresponding thyratron in each print mechanism bank thereof; that is, of one grid of each of the thyratrons of that order, all of the thyratrons pertaining respectively to the X, 0, 1, 2, 4, 8, and R bits being designated as the different orders of thyratrons. Only one of the thirty possible thyratrons may be fired at this time, however, and this is the one whose other grid is currently being biased along with those of the remainder of the bank of thyratrons through the storage exit hub and an input hub.

The exit hubs are pulsed synchronously with the reading of corresponding digits on the drum information track by the diode matrix operating from ring positions operated from the one hundred spot synchronizing track. The reading of successive spots on this track acts, in conjunction with the reading of successive ones of ten permanent spots on a third synchronizing track, through corresponding ten stage closed rings to step along a one hundred point diode matrix in which the points are successively rendered hot. The exit hubs are respectively connected to the one hundred points on the diode matrix and hence are hot for the periods in which the corresponding seven bit digit spaces on the information track are read. The control grids for a bank of thyratrons may be thus conditioned so that the thyratrons will receive any digit in any sub-cycle by properly plugging the corresponding storage exit hub with the particular input hub that is connected in that sub-cycle with the thyratrons.

A thyratron fires when both grids are conditioned. Since the bit pulses emanating from the bit distributor are momentary, and a control pulse emanating from an exit hub is only slightly longer involving, namely, the time necessary for the seven individual bit pulses of a digit, provision is made to hold the thyratrons by heater resistors. Thus the thyratrons remain conductive while the read-out of the rest of the information is accomplished. The drum rotates several revolutions in each printer sub-cycle, and it is possible that overlapping read-outs of the same information may be accomplished before the read-out gate is opened. No harm results from this, however, as the reconditioning of the grids of thyratrons which are already firing introduces nothing.

After a time sufficient to transfer all of the information to the thyratrons, cam contacts shunting the heater resistors in the thyratron circuits are closed to connect the thyratrons with the magnets of the respective print mechanisms. The results in the pulsing of those print magnets whose corresponding thyratrons have been rendered conductive and constitutes the print magnet pulse time. The pulse time is terminated by the opening of printer controlled cam contacts in the plate circuits for the thyratrons, resulting in the latter's extinguishment.

The information which has been transferred to the sets of print magnets is then transferred to the corresponding code rods for the corresponding print mechanisms by mechanisms such as are described in the copending application Serial No. 479,106 of Frank J. Furman, Otto F. Moneagle, and Robert V. Simpson, filed December 31, 1954, now U.S. Patent No. 2,907,270, issued October 6, 1959. Thereafter the positioned code rod is moved against the print wires to impress a differential setting thereupon, and after that the print heads carrying the other ends of the preset print wires are moved against a platen to effect printing in every fourth print position across the line currently being printed.

In the meantime, printer control cam contacts have operated to advance the sub-cycle select control. This operatively connects the second of each set of four printer input hubs with one of the grids of the corresponding bank of thyratrons so as to enable their setting up to characters which are to be printed in the print positions adjacent those just being printed. Thereafter, the cam contacts controlling the read-out gate would again be closed to permit the transfer of information to condition the print mechanisms anew.

The process described above for the first and second sub-cycles would be followed to effect the third and fourth sub-cycles. By this time a complete line of printing would have been effected to finish the particular print cycle. Also, the information on the drum track would have been utilized, and new information is needed thereon to effect the printing of the next line. Thus, printer controlled cam contacts could be used to operate an input gate to the information track so that by the time of the first sub-cycle of the first cycle, a new line of information is available.

In this next or second cycle and in alternate future or even numbered cycles, the print heads are shifted laterally from right to left to print the information in the reverse order that they did in the first cycle. Thus, where formerly the print heads first printed the first of four following characters, the print heads now print the fourth of four preceding characters. In order to accomplish this, an inverter control is embodied with the sub-cycle select control. This inverter control, which includes printer controlled cam contacts, reverses the order in which the sub-cycle select control is effective to connect each set of four input hubs to the corresponding print thyratrons. At the end of the four sub-cycles, that is, the second cycle, the inverter control will again reverse the sub-cycle select control so that they then operate in the first described order.

The redundant bit thyratrons operate in the same fashion as the thyratrons for the print magnets. However, when the cam contacts shunting the heating resistors are closed, the thyratrons pulse relays which close contacts in series with transfer contacts controlled by the code rod and in the fashion disclosed in the copending Rex application Serial No. 478,787, now U.S. Patent 2,829,593, earlier referred to. If the code rod was positioned to a character which corresponds in odd or even bit designation to the odd or even number of bits supplied to the print thyratrons for the corresponding print mechanism, no circuit will be completed through the relay control contacts and the transfer contacts to pulse a machine controlling relay. On the other hand, if a discrepancy obtains between the bit count imparted to the thyratrons and the bit count of the character to which a code rod was positioned, a circuit is completed to the machine controlling relay to indicate the presence of an error.

Other objects of the invention will be pointed out in the following description and claims and illustrated in the accompanying drawings, which disclose, by way of examples, the principle of the invention and the best mode which has been contemplated of applying that principle.

Figure 5A:
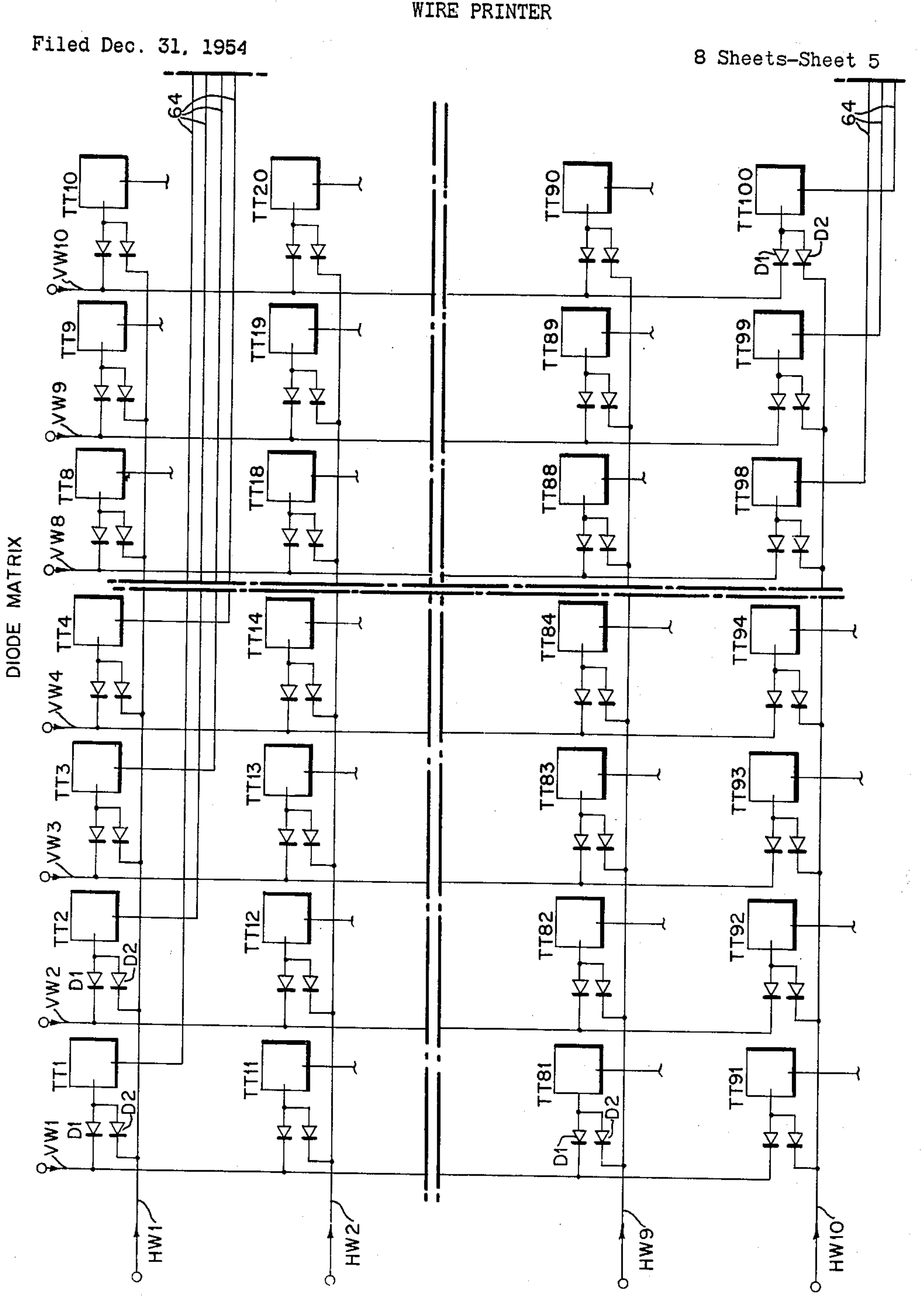
Figure 5B:
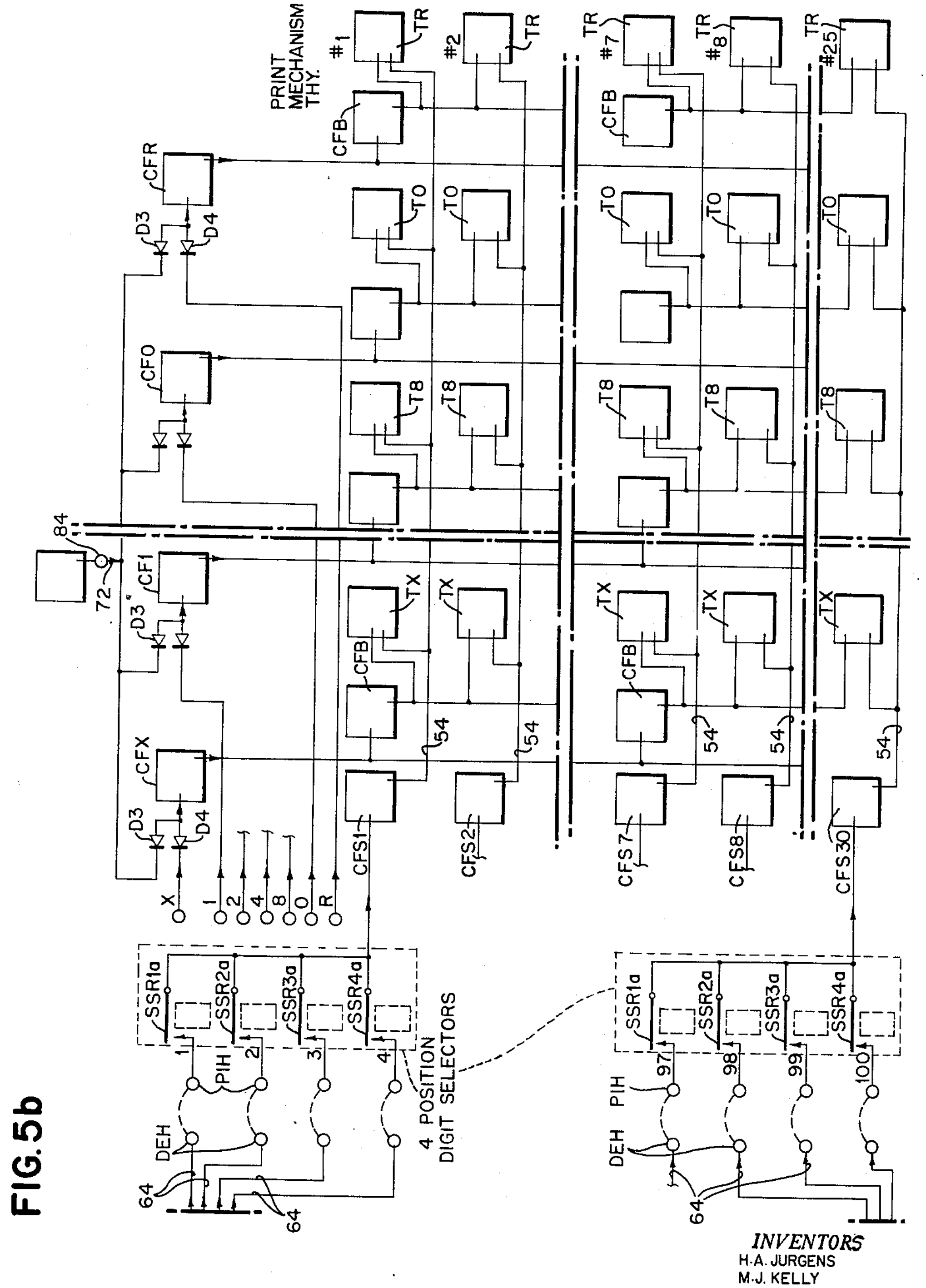

Fig. 5, when arranged with Fig. 5*b* to the right of Fig. 5*a*, is a wiring diagram of part of the circuitry employed in the invention.

Figure 6:
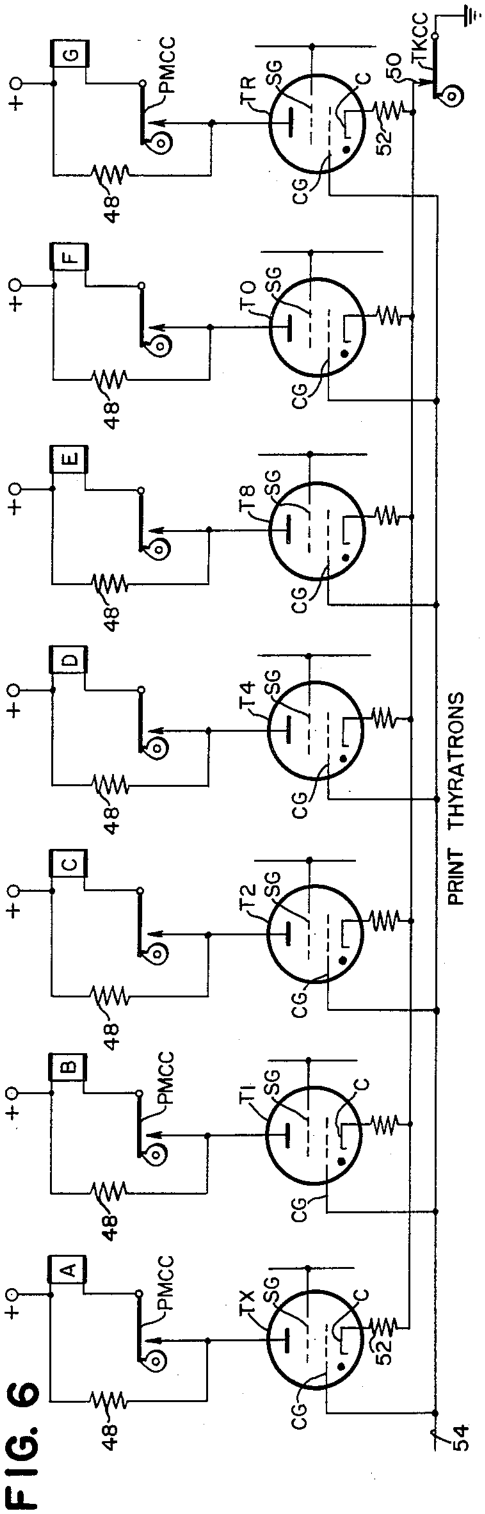

Fig. 6 is a detailed wiring diagram showing the typical connections between a bank of thyratrons and the corresponding print magnets and printer controlling relay.

Figure 7:
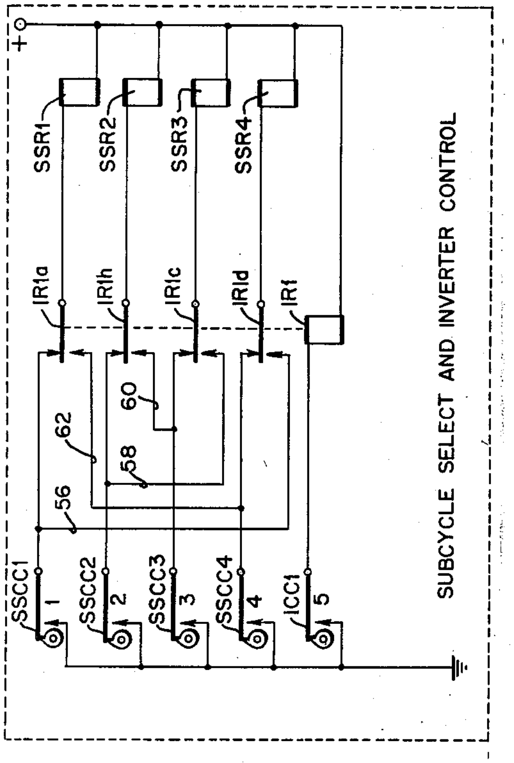

Fig. 7 is a detailed wiring diagram of the sub-cycle select and inverter control.

Figure 8:
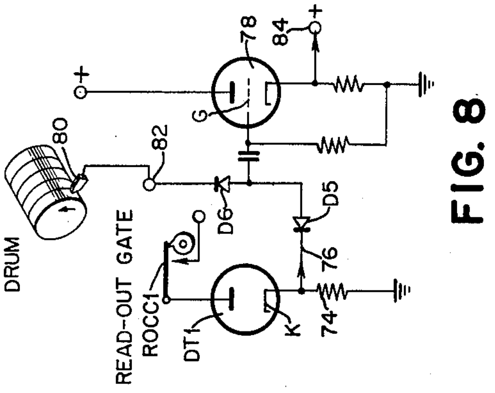

Fig. 8 is a detailed wiring diagram of the printer-controlled read-out gate.

Figures 1, 9:
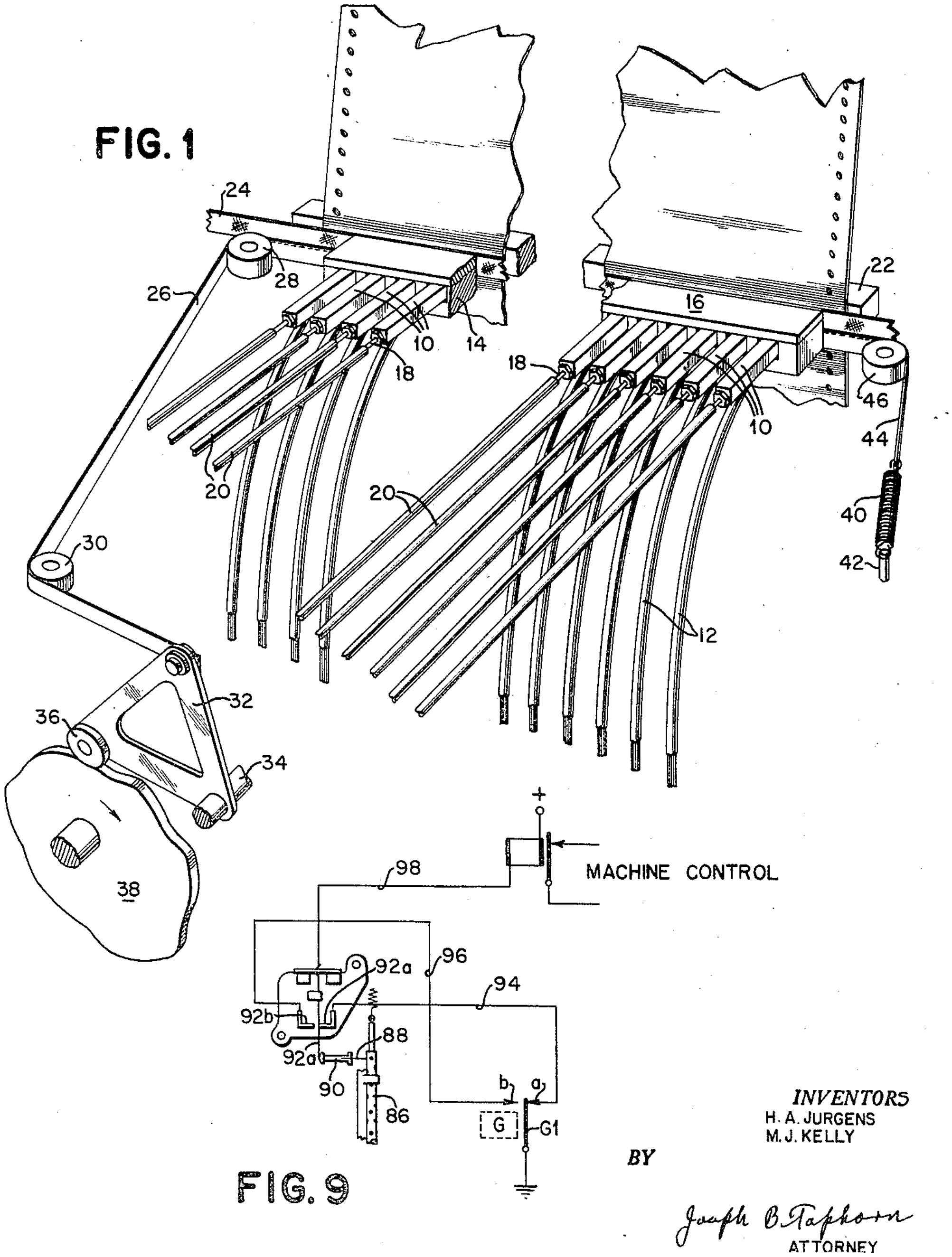
Fig. 1 is a view in perspective of a portion of a printer constructed according to the instant invention.

Fig. 9 is a detailed view showing a redundant bit checking system.

Figure 10:
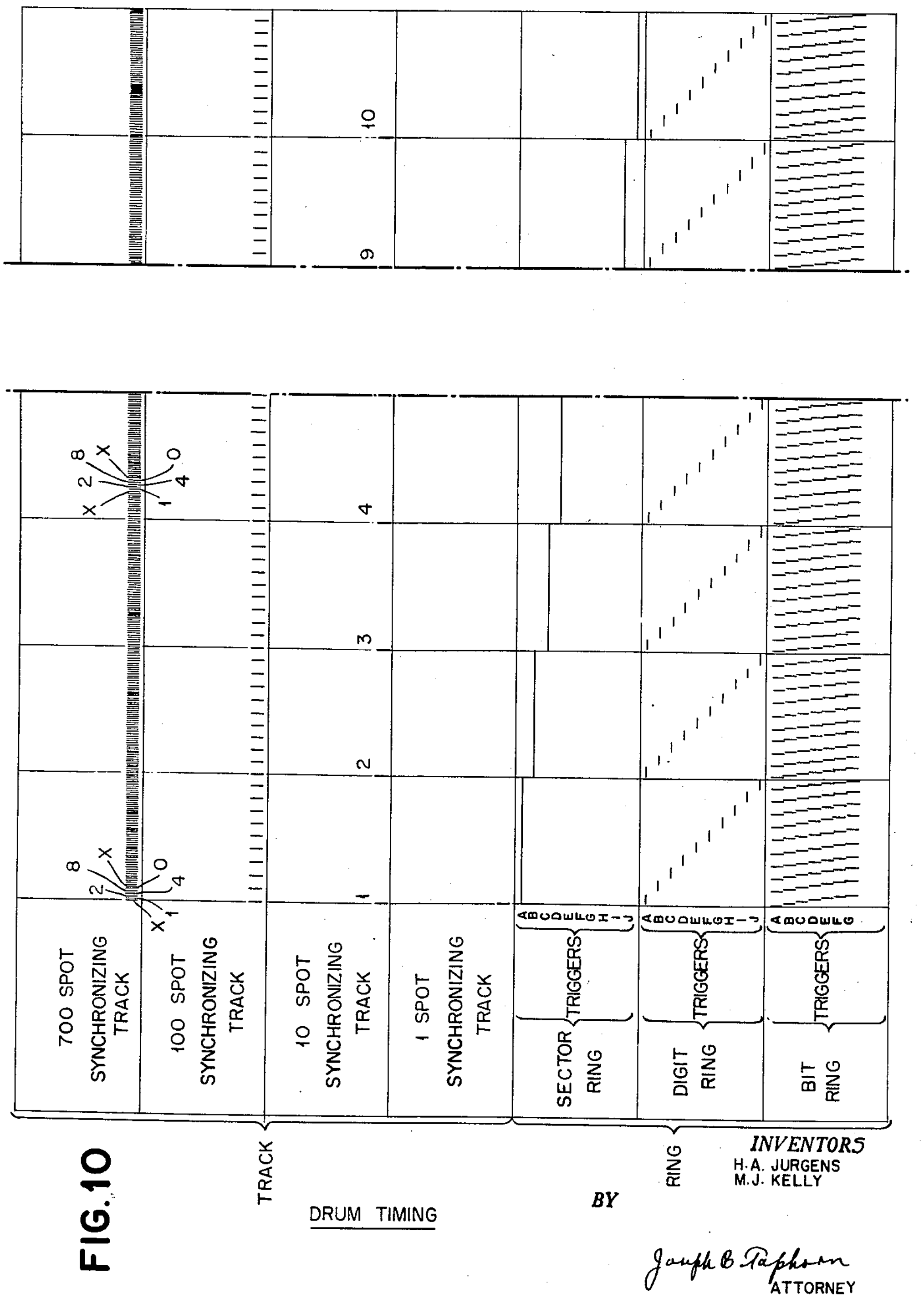

Fig. 10 is a chart depicting the timing of various magnetic drum controlled elements.

*Print head carriage control*

Referring to the drawings and more particularly to Fig. 1, a printer is shown as being comprised of a plurality of print heads 10 which are attached to the upper end of print wire guide tubes gathered together to form cables 12. Each print head is shown as being slidably mounted in notches cut in the upper surface of a transversely extending bar 14 and as being held therein by a top plate 16. The front ends of these print heads are attached to the rear ends of drive wires 18 which are slidably disposed in guide tubes 20 extending forwardly in the machine. The rearward ends of the print heads have a normal position in which they lie flush with the rearward surface of the bar, and when the drive wires are driven rearward the print heads undergo an impact stroke against a platen 22. This platen is adapted to cooperate with a suitable paper carriage, such as a form feed, by which a form is advanced over the platen. A ribbon 24 may be placed between the print heads in the form so that character patterns formed on the face of the print heads by preset print wires projecting therefrom are transferred therethrough to the form.

It is a feature of this invention that the print heads may be shifted laterally of the platen so as to print in adjacent character positions in both directions. To this end, the notched bar 14 is suitably mounted in the machine for sliding movement and connected at its left-hand end, as seen in Fig. 1, to a flexible tape 26. This tape may be guided around roller guide posts 28 and 30 to where its other end is attached to the upper end of a compound lever 32 pivotally mounted in the machine on a rod 34. Another portion of this lever is provided with a roller 36 which rides on the surface of a continuously rotatable stepped cam 38.

Figure 3:
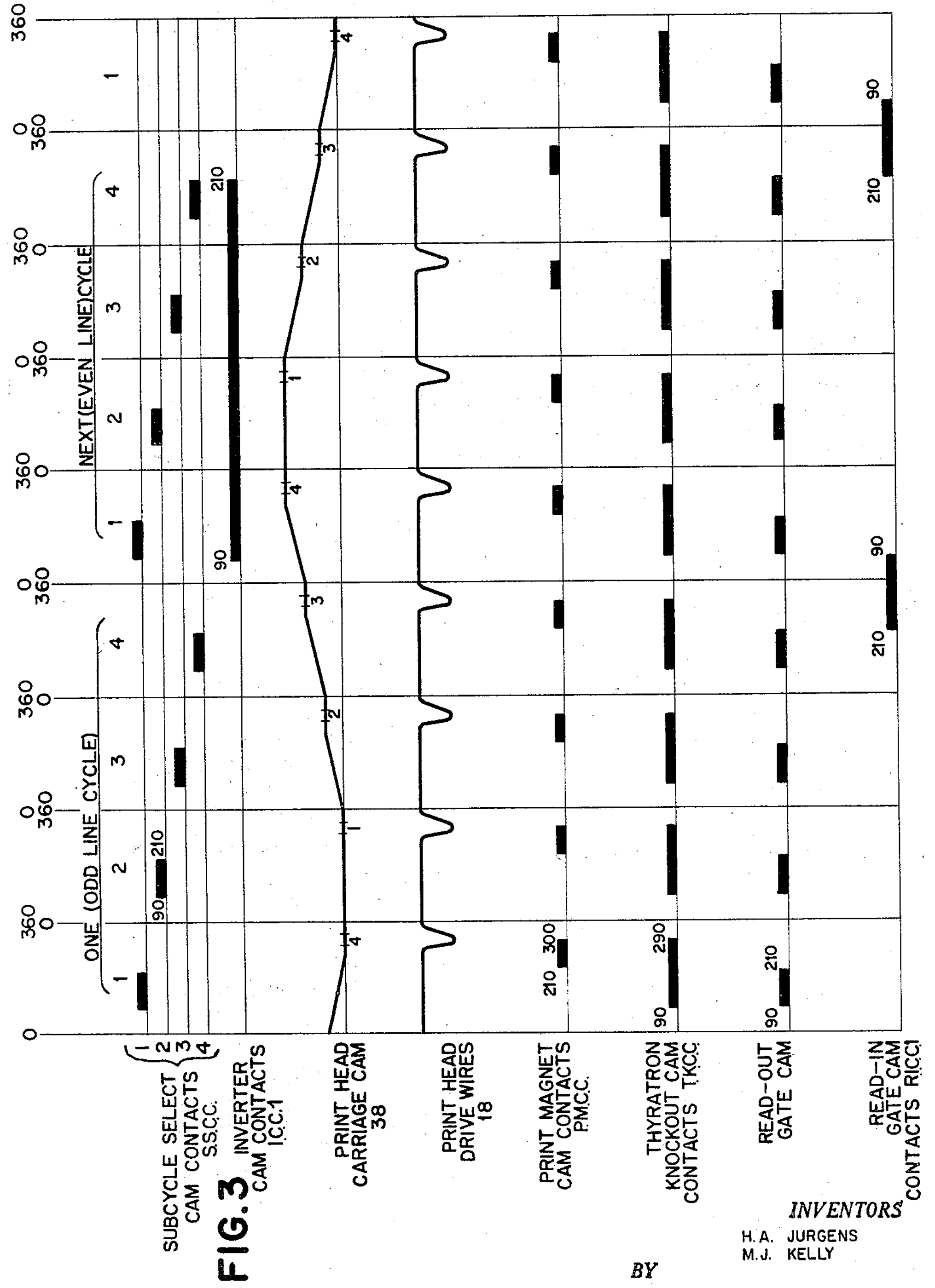
Fig. 3 is a chart depicting the timing of various mechanical elements of the printer.

The print heads are made to follow the contour of the stepped cam 38 through the bias of a tension spring 40. This spring, anchored at one end to a frame element 42 of the printer, is attached at its other end to another tape 44 which is guided by a roller post 46 and affixed at its other end to the transversely extending bar 16. Thus, it can be seen that the action of the spring at all times urges the print heads to the right, but that this movement is limited by the action of the lever roller 36 engaging the surface of the continuously rotating cam 38. The contour of this cam may be seen in Fig. 3 wherein the four different levels by which the print heads are successively advanced to four different positions in one direction and thereafter restored through four different positions in the other direction are clearly shown.

Figure 2:
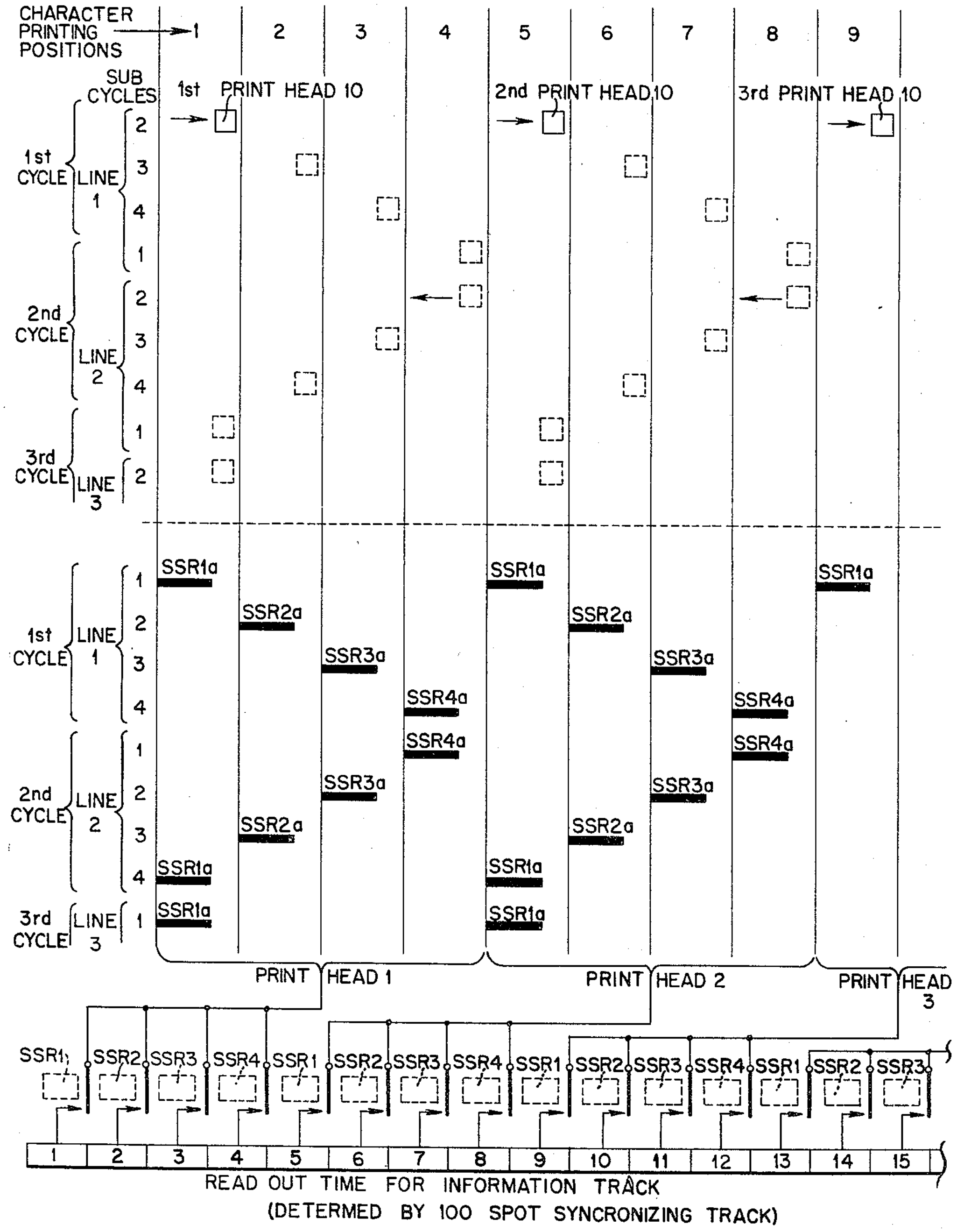
Fig. 2 is a chart depicting schematically the printing operation of the printer disclosed in Fig. 1.

The actual operation of the print heads is clearly depicted in Fig. 2. In the second sub-cycle of a cycle of printer operation necessary to print an entire line, the first, second, third, etc., print heads will print in the first, fifth, ninth, etc., print positions of a line with the information to which the print mechanisms were set up in the first cycle. Between the impact time of the second sub-cycle and the impact time of the next sub-cycle, the cam 38 will have rotated to where the lever 32 is on the second step thereof. Thus, in the third sub-cycle, the first, second, third, etc., print heads will print in the second, sixth, and tenth print positions. For the fourth sub-cycle, the first, second, third, etc., print heads will be advanced to the third, seventh, eleventh, etc., positions, and for the first sub-cycle of the following cycle, these print heads will be respectively advanced to the fourth, eighth, twelfth, etc., character printing positions. By the end of the first sub-cycle of the second cycle, since the print heads are spaced four print positions from each other, it will be evident that a complete line of print will have been obtained. During the next four sub-cycles of the printer, the second line of print would be obtained on a form, it being assumed that the paper form had been fed between the impact strokes of the first and second sub-cycles in the second cycle by a suitable paper carriage such as is disposed in the copending application of Frank J. Furman, Otto F. Moneagle, Theodore D. Koranye, Kenneth E. Rhodes, Douglas R. Wetjen, and Albert A. Dowd, Serial No. 479,062, filed December 31, 1954, and now U.S. Patent 2,842,246. Thus, in the second sub-cycle of the second cycle, the first, second, third, etc., print heads would print in the fourth, eighth, twelfth, etc., print positions in a second line on the paper form. In the third sub-cycle, the first, second, third, etc., print heads would print in the third, seventh, eleventh, etc., print positions, while in the fourth sub-cycle, they would print in the second, sixth, tenth, etc., print positions. In the first sub-cycle of the third cycle, these print heads would again be printing in the first, fifth, ninth, etc., print positions, and they would remain in these positions for the second sub-cycle of the third cycle wherein they would start the printing of the third line.

*Print thyratrons*

Each print mechanism, as has been pointed out, embodies six magnets and a checking relay respectively denominated A, B, C, D, E, F, and G. These respectively are disposed in the plate circuit of seven thyratrons respectively denominated TX, T1, T2, T4, T8, T0, and TR. Fig. 6 shows a typical bank of thyratrons for a print mechanism. The thyratrons, which may be the commercially available Du Mont type 2D21, are each provided with a shield grid SG and a control grid CG, both of which must be simultaneously conditioned in order to fire the thyratron. When this condition does obtain in a thyratron, it fires and holds through a heater resistor 48 which passes only the minimum current needed to maintain an ionized condition in the thyratron. The pulsing of the print magnets and relay is affected by the closing of printer controlled cam contacts PMCC shunting the heater resistors 48 and in series with the corresponding print magnets. The print magnets are thereafter dropped by the opening of cam contacts TKCC in a common line 50 leading to the cathodes C of the respective thyratrons. Not only does the opening of the printer controlled cam contacts TKCC result in the deenergization of the print magnets A through F and the relay G, but it also extinguishes the firing thyratrons. Resistors 52 in the cathode circuits for the respective thyratrons limit the current values through the respective tubes to safe values.

The control grids CG for the thyratrons of each bank are connected to a common wire 54 operatively connected, through pulse strengthening cathode followers CFS, to a four position digit selector of the sub-cycle selector and inverter control which determines in what sub-cycles the printer input hub pulses are delivered. The shield grids for the respective orders of thyratrons, that is, the TX's, the T1's . . . TR's, in each bank are commoned so that they will be simultaneously conditioned whenever the corresponding bit for each digit appears on the magnetic drum information track. Since a thyratron can only fire when both of its grids are conditioned, it will be evident that for only one bit time in a drum revolution can the coincidence take place which will fire a particular thyratron. When this coincidence does take place, the tube ignites and holds through its heater resistor even though the bias on the grids is discontinued. Thus, the firing thyratrons holding through the heater resistors until print magnet and checking relay pulse time serve as temporary storage devices.

*Sub-cycle select and inverter control*

The delivery of the different digits on the drum information track to the print mechanisms in the right subcycle is effected through this control which embodies a four-position selector for each bank of thyratrons. This selector is located in the common line leading to the thyratron control grids and embodies a relay operated contact SSR1*a*, SSR1*b*, SSR1*c*, or SSR1*d* (Fig. 5*b*) in the lead for each of the four printer input hubs PIH for a particular print mechanism. Only one of these relay contacts is closed in each sub-cycle so that only one of the four possible digits to be printed in a sub-cycle by a particular mechanism is admitted in any particular sub-cycle. The means by which the relay operated contacts are respectively closed in the four different subcycles of a cycle is disclosed by the wiring diagram of Fig. 7.

A printer includes four cam operated contacts SSCC1, SSCC2, SSCC3, and SSCC4 which are respectively closed in the four different sub-cycles of a cycle. Normally circuits extend through the cams to four corresponding relays SSR1, SSR2, SSR3, and SSR4. Thus, in each of the four different sub-cycles of a cycle, a successive one of these relays is energized and operates to close an associated *a* contact in each of the four-position digit selectors associated with the respective banks of thyratrons. This is the order in which the relays are picked up when the print heads are being shifted from right to left in an odd numbered cycle.

In the next or even numbered cycles, wherein the print heads are shifted from left to right, the relay contact in the four-position digit selectors must be closed in inverse order in order to get the right information to the print mechanisms at the right times. This is accomplished by providing another printer controlled set of inverter cam contacts ICC1 which are closed in the alternate or even numbered cycles to energize a relay IR1. The picking up of this relay transfers a series of contacts IR1*a*, IR1*b*, IR1*c*, and IR1*d* in circuit with the respective relays SSR1, SSR2, SSR3, and SSR4 so that the sub-cycle select cams are now connected in inverse order to these relays. For example, the cam contacts SSCC1, which are closed in the first sub-cycle of the second cycle, will be connected by wire 56 through the now transferred contacts IR1*d* to energize the sub-cycle select relay SSR4. Cam contacts 2, 3, and 4 are respectively connected through wires 58, 60, and 62 through now transferred contacts IR1*c*, IR1*b*, and IR1*a* to pick up the sub-cycle select relays SSR3, SSR2, and SSR1, in that order. At the end of the second cycle, the inverter cam contacts ICC1 open to drop the relay IR1 which permits the transferred contacts to restore so that in the next or odd numbered cycle the closing of the cam contacts 1, 2, 3, and 4 will energize the sub-cycle select relays SSR1, SSR2, SSR3, and SSR4, in that order.

*Diode matrix*

The nature of the diode matrix is disclosed in Fig. 5*a*. Essentially, it consists of one hundred triode tubes, each of which is mounted in the well known cathode follower type of circuit, designated by blocks TT1 to TT100, in which conditioning of the tube grid induces a current in the plate circuit which, because of a load resistor in the lead to the cathode, provides a positive drive at the cathode which may be taken off by wires such as 64 and imparted to the respective digit exit hubs DEH.

The various triodes are disposed in the matrix through an arrangement of ten vertical and ten horizontal wires VW1 to VW10 and HW1 to HW10, respectively. At each intersection of the wires, the grid of a corresponding triode is connected through a pair of diodes D1 and D2, each having unilateral conductivity, to the respective intersecting wires. These diodes provide a coincidence means which requires that the two intersecting wires be simultaneously pulsed in order to condition the grid. Thus, it can be seen that, if pulses are successively applied to the vertical wires and pulses having time durations equal to the combined time of the pulses applied to the vertical wires are successively applied to the horizontal wires, the triodes will be successively rendered conductive to pulse, because of the cathode follower type of circuits, the corresponding digit exit hubs DEH. Successive pulsing of the vertical wires and of the horizontal wires may be accomplished by the one hundred spot and the ten spot synchronizing drum tracks through the instrumentalities of the ten stage closed rings, such as are taught by U.S. Patent No. 2,551,119 issued to Haddad et al. on May 1, 1951.

*Ten stage closed rings*

Figure 4:
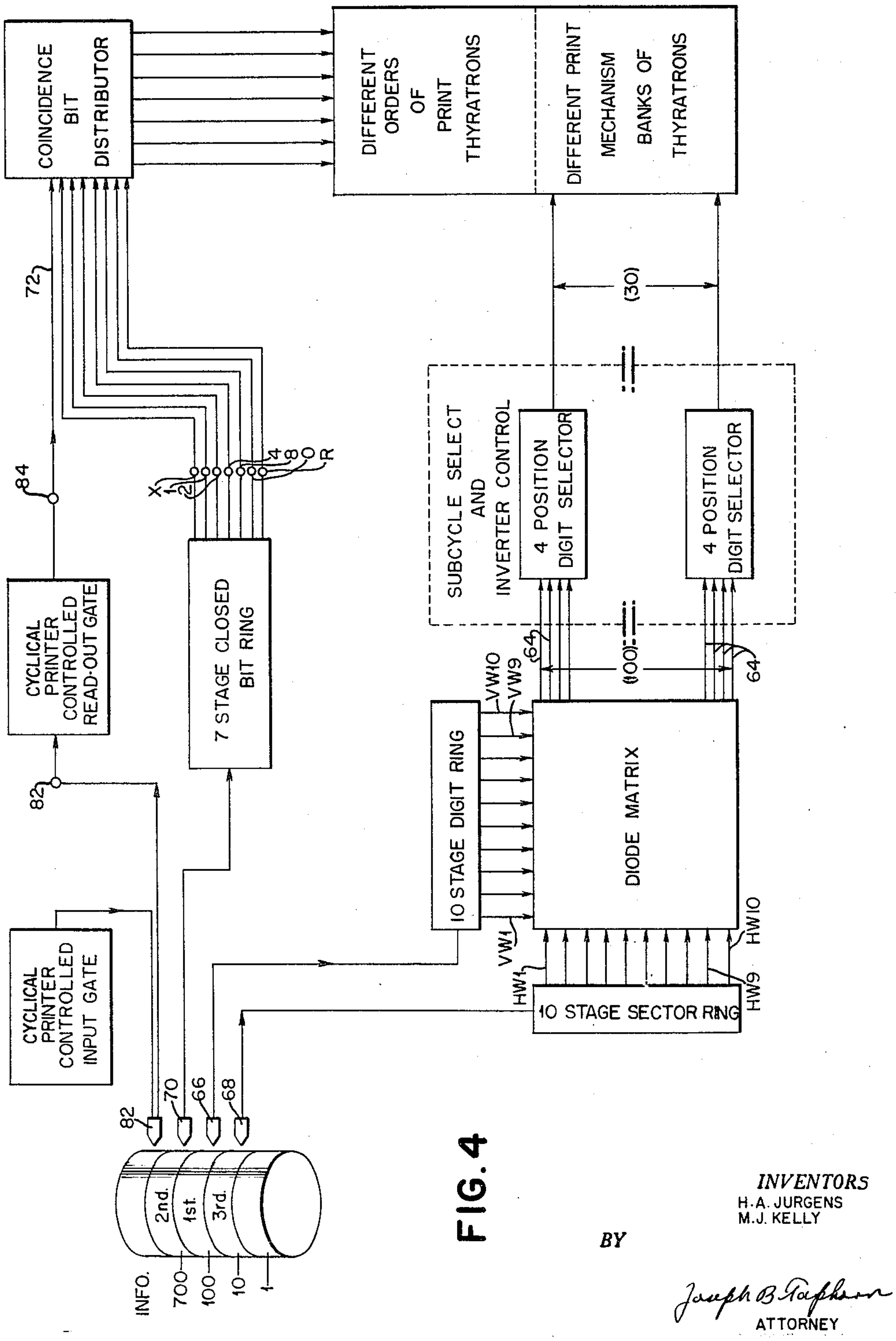
Fig. 4 is a block diagram of the circuitry by which information is supplied to the printer from a magnetic drum.

The Haddad et al. Patent No. 2,551,119 shows a closed ring type of commutator (Figs. 1 and 4) having a series of triggers each connected to a higher one and with the end one connected to the first one so that successive pulses turn an On trigger Off and the next trigger On. A pulse occurring when the end trigger is On acts to turn that trigger Off and the first trigger On again. It will be evident that suitable connections may be made with each trigger so that, while it is in the On condition, it does emit a positive pulse.

It will also be evident that, since the connections between the trigger A and the trigger B, the trigger B and the trigger C, and the trigger C and the trigger D of the patent are alike, any number of triggers embodying similar connections may be inserted in the chain to provide a closed ring having so many additional stages. Since, in the diode matrix employed, there are ten vertical wires VW1 to VW10 which must be successively pulsed as well as ten horizontal wires HW1 to HW10 which must be successively pulsed, ten stage rings or commutators are required, and such rings or commutators may be obtained by providing six additional triggers in the ring disclosed in the above identified patent. Thus, there are obtained ten stage closed rings, each having triggers which may be denominated A, B, C, D, E, F, G, H, I, and J. Such triggers for the respective rings, the digit ring and the sector ring, would be respectively connected to the ten vertical wires and to the ten horizontal wires, so that positive going pulses would be imparted to the respective wires at the times indicated by the chart of Fig. 10. It will be evident that the ten stage closed rings will engage in repetitive cyclical operation as long as suitable trains of pulses are supplied thereto.

The trains of pulses are obtained from different tracks on the magnetic drum. Thus, the digit ring for the vertical wires VW1 to VW10, which must be stepped along for each digit, is connected to a read head 66 which is operated by the one hundred spot synchronizing drum track. Since there is one spot on this particular track for each digit space on the information track, it will be evident that the digit ring will be advanced one position for every digit space on the information track. The train of impulses for the sector ring which supplies the positive pulses to the horizontal wires HW1 to HW10 is obtained from the read head 68 for the ten spot synchronizing drum track, though it will be evident that the pulses necessary to step this ring could be obtained from the digit ring, as for example from the pulse which is effective when the end trigger J of the digit ring is switched Off and the first trigger A is switched On again. The sector ring operates at only one-tenth the speed of the digit ring and is operative during a particular stage to condition a particular row of the triodes shown in Fig. 5. Coincidence between pulses on the horizontal wires and the vertical wires results in a stepping through the matrix with the result that the rigit exit hubs DEH are successively pulsed.

*Seven stage closed bit ring*

This ring is similar to the digit ring and sector ring controlling the diode matrix, but instead of ten, it has only seven triggers. Thus, three triggers instead of six are inserted in the ring commutator disclosed in the Haddad et al. patent, and the triggers may be respectively denominated A, B, C, D, E, F, and G. The train of impulses for stepping this bit ring are obtained from the read head 70 for the seven hundred spot synchronizing track on the magnetic drum. The respective triggers of this bit ring are connected to produce positive pulses for each of the seven corresponding bit spaces on the information track. Thus, the terminals X, 1, 2, 4, 8, 0, and R (Fig. 5*b*) are successively pulsed by the action when the corresponding bit ring triggers A to G are successively switched On at times clearly shown in the timing chart of Fig. 10.

*Coincidence bit distributor*

Incoming information bits are distributed through seven coincidence networks of the bit distributor. Each of these networks includes a pair of unilaterally conductive diodes D3 and D4, one of which is connected on one side to a common input wire 72, while the other is connected on one side to a corresponding one of the terminals X, 1, 2, 4, 8, 0, and R of the digit ring. On their other sides the diodes are commoned to the input for the grids of triodes in corresponding cathode followers designated in Fig. 5*b* by the blocks CFX, CF1, CF2, CF4, CF8, CF0, and CFR. When coincidence occurs between a pulse on the information input wire 72 and a particular pulse emanating from one of the digit ring terminals, it is indicated that the particular information input pulse has a value corresponding to the digit ring terminal value, and in accordance therewith the grid of the corresponding cathode follower triode is raised to render the tube conductive. In turn, the cathode follower provides a positive pulse which is delivered to all of the thyratrons corresponding to the bit order. The positive pulse is actually delivered to the various shield grids of the order thyratrons through another or booster cathode follower CFB, of which there is one for every six thyratrons of that order. Since there are thirty thyratrons in each order, one for each print mechanism, it obtains that five booster cathode followers CFB are driven by each of the cathode followers of the coincidence networks, and, as pointed out, each of these in turn controls the shield grids of six thyratrons, thereby insuring the necessary bias level for these grids. It should be recalled at this time that coincidence between a bit pulse applied to the shield grid of all of the thyratrons of that order and a digit pulse applied to all of the thyratrons of a particular print mechanism bank will result in a particular thyratron being fired and remaining ionized to store the information until the print magnet pulse time.

*Read-out gate*

This gate is shown in Fig. 8. It may be operated by a pair of printer controlled cam contracts ROCC1 which act to complete a cathode follower circuit. This circuit may consist of a diode tube DT1 having a resistor 74 in series with its cathode K. When the cam contacts ROCC1 close, the bias impressed across the tube renders it conductive, and the voltage rise across the resistor results in a positive output on the wire 76. This wire is the output to a coincidence network.

The coincidence network includes a pair of unilaterally conductive diodes D5 and D6 in parallel with the grid of a triode tube 78 in the cathode follower circuit. A positive output of the diode cathode follower circuit renders the grid G of the triode cathode follower circuit responsive to the pulse output of the read head 80 for the information track connected to the terminal 82. Thus, whenever a positive pulse comes from the read head, it is impressed on the grid of the triode to render it conductive for its duration. The ouput of this triode cathode follower circuit in turn is delivered to the terminal 84 which is the information input terminal disclosed in Fig. 5*b*.

The cam is closed for a time sufficient to enable a complete read-out of the information on the drum track. At the end of this time the cam contacts are opened to render the diode DT1 non-conductive, with the result that its output over the wire 76 drops. This voltage drop is to a level wherein continued output of the print head is ineffective to render the triode conductive, with the result that no further information is supplied to the print thyratrons. As pointed out before, a second pulsing of the various print thyratrons does no harm, so it is not important that the cam contacts be made and broken at precise times relative to a magnetic drum revolution. It suffices that the time is sufficient for a complete read-out.

*Redundant bit checking*

As pointed out earlier, a redundant bit may accompany the digit representing bits according to whether the number of such bits is odd or even. A redundant bit may be added earlier, by a suitable device, to the bits whenever their number is odd; thus all digits are represented by an even number of bits on the information drum track.

A code rod 86 (Fig. 9) may be made to indicate whether the bit designation for the character to which it is positioned should include a redundant bit or not. If not, it may be made to shift a special wire 88 along with the print wires to where a slug 90 thereon moves the common strap 92 of a set of transfer contacts to where the points 92*a* open and the points 92*b* close. If a redundant bit should occur in the bit designation of the character to which it has been positioned, a hole may be formed in the rod at the appropriate point to render it ineffective to move the wire 88 and transfer the contacts 92.

The redundant bit thyratron TR fires if the bit was present in the digit representation to pick up relay G. Relay G transfers contacts G1 to open *a* points and close *b* points. Now point G1*a* are connected by wire 94 to points 92*a* while points 61*b* are connected by wire 96 to points 92*b*. The common strap of contacts G1 is connected to ground while the common strap 92*a* is connected by wire 98 to the plus side of power source through a machine controlling relay whose energization would indicate that a discrepancy exists. The machine controlling relay will be energized if the code rod indicates a redundant bit should have been present and did not transfer the contacts 92 while the relay G was not pulsed by the redundant bit thyratron to transfer the contacts G1. Similarly, if the code rod indicates a redundant bit should not have been present, while the bit thyratron was fired by a redundant bit to energize relay G and transfer contacts G1, the machine controlling relay will be energized. On the other hand, if correspondence occurs between the redundant bit indication of the code rod and of the relay G, no circuit will be completed to the machine controlling relay. It can be seen that there has been provided a fairly reliable means by which discrepancies between the pulsing of the print magnets and the positioning of the code rod can be detected.

*Operation*

A printer of the type described may be operated at a printing speed of 400 lines per minute; hence, the different print mechanisms are operated at 1600 times per minute. The time it takes the machine to print one line is designated as a machine cycle, and the time required for each operation of the print mechanism is designated as a sub-cycle; therefore, four sub-cycles will exist in each machine cycle. If the information, as is shown, is recorded on a single track of a magnetic drum, such a drum may be operated at a speed of 5,084 revolutions per minute. Thus, over three drum revolutions would occur in each printer sub-cycle, and one-third of a printer sub-cycle of 120° sub-cycle time more than suffices to accomplish the reading in and out of the information on the drum track.

When the printer is placed in operation, it proceeds to where the read-in gate cam contacts RICC1 are closed at 210° of the fourth sub-cycle. This opens a read-in gate of any well known form to permit transfer of digital information to the drum track from, for example, another drum track. After 120° of sub-cycle time, specifically 90° of the first sub-cycle in the next cycle, all of the information will certainly have been read into the drum track. The printer will thus be enabled to operate throughout the first cycle, and the read-out gate cam contacts ROCC1 will close between 90° and 210° of this first sub-cycle to effect the first setting up of the print mechanisms. With the closing of read-out gate, the digit bits being read by the read head on the information drum track will be delivered serially to the coincidence bit distributor.

The magnetic drum rotates continuously, and the various rings are continuously stepped along, though at their own particular speeds. Thus, the seven-stage bit ring controlled by the seven hundred spot synchronizing track will repeatedly present seven distinct pulses, timed to coincide with the reading of bits on the information track, to the coincidence bit distributor. The coincidence bit distributor in turn will serially pulse the different shield grids of the different orders of thyratrons according to the presence or absence of corresponding bits in each digit.

The one hundred and the ten spot synchronizing drum tracks will respectively operate the ten stage digit ring and the ten stage sector ring to step the diode matrix through its one hundred points for each revolution of the magnetic drum. These activities of course are synchronized with the delivery of the digit bits to the coincidence bit distributor, and the digit exit hubs DEH corresponding to the digit bits being fed to the coincidence bit distributor are pulsed. Now, if the digit exit hubs are plug-connected to the printer input hubs PIH which are connected, in the particular sub-cycle by the select and inverter control digit selector, to the control grids of a corresponding bank of print thyratrons, the information being distributed through the bit distributor will be stored through the firing of the corresponding print thyratrons which hold through the respective heater resistors 48. Thus, by 210° of sub-cycle time whereat the read-out cam contacts ROCC1 open, the magnetic drum will have completed at least one revolution to enable the reading out of any of the digits located around the information track.

The thyratron knock-out cam contacts TKCC made at 90° and hold until 290°. At 210° sub-cycle time the print magnet pulse cam contacts PMCC close to place the corresponding print magnets in circuit with the corresponding thyratrons. Thus, various print magnets will be pulsed between 210° and 290° sub-cycle time, the latter point being that at which the thyratron knock-out cam contacts TKCC open to de-ionize the thyratrons. After the respective print magnets have been pulsed, the information is transferred to the corresponding code rods by mechanisms such as are disclosed in the copending application Serial No. 479,106 earlier referred to. Thereafter, the code rods which may have been positioned to any of a number of character-determining positions are moved against the control ends of print wires and the redundant bit wire 88, and this action is completed before the 300° cycle time at which the print head cam is effective in the second sub-cycle. Thus, it should be observed that the information which was transferred from the drum to the print mechanisms in the first sub-cycle is not printed until near the end of the second sub-cycle. Accordingly, the print head carriage cam lags by one sub-cycle, and in the second sub-cycle the corresponding print heads will be effective to print in the first character positions. Thus, it can be seen that the information transferred to the print mechanisms in the second, third, and fourth sub-cycles will be printed in the second, third, and fourth character positions on the right in the third and fourth sub-cycles of the first cycle and the first sub-cycle of the next or second cycle, respectively. In the next cycle, when the direction of the print heads will be from right to left, the fourth character position will be printed in the second sub-cycle with the information transferred in the first sub-cycle, while the third, second, and first character positions will be printed in the third and fourth sub-cycles of the second cycle and the first sub-cycle of the third cycle from information transferred in the second, third, and fourth sub-cycles of the second cycle.

Returning to the first cycle, it may be observed that the information will be transferred from the drum to the print mechanisms in the second, third, and fourth sub-cycles in the same manner as was accomplished in the first sub-cyle. The different digits will have been transferred due to the successive closing of the cam contacts SSCC1, SSCC2, SSCC3, and SSCC4 to pick up respectively the sub-cycle select relays SSR1, SSR2, SSR3, and SSR4. Near the end of the fourth sub-cycle of the first printing cycle, the read-in gate cam contacts will be closed at 210° and will remain closed for 240° to provide ample time to obtain the proper oriented read-in to the information track of the drum. The time necessary to accommodate almost two revolutions of the drum is allowed, as the home position of the drum indicated by a single spot on the one drum track may have to be located at least once in order to allow proper read-in.

In the second sub-cycle the correspondingly located digits are supplied to the respective print mechanisms in inverse order. Thus, the inverter cam contacts ICCI are closed by 90° of the first sub-cycle of the second cycle and remains continuously effective to at least 210° of the fourth sub-cycle to energize the inverter relay IR1 which reverses the connections that the sub-cycle select cam contacts SSCC1, SSCC2, SSCC3, and SSCC4 make with the relays SSR1, SSR2, SSR3, and SSR4. Thus, whereas the *a* contacts of these relays connected to the corresponding printer input hubs PIH for each bank of thyratrons were closed in that order in the first cycle, they are now closed in the *d, o, b, a,* order in the cycle. In all other respects, the second cycle will then be operated as in the first sub-cycle with the exception, as observed above, of the print heads now being shifted from the right to the left. When the second cycle ends, the inverter cam of course will have dropped out so that the third cycle may proceed in the same fashion as the first cycle. In the further operation of the printer, the odd and even numbered cycles would be exactly as the odd and even numbered cycles already described.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus, a device for repeatedly presenting data in the same order, a plurality of laterally spaced data mechanisms each operable in successive operations to print in adjacent character positions, and means for reading succeeding ones of spaced groups of data repeatedly presented by said device and successively conditioning the corresponding mechanisms to print the same in successive operations.

2. In an apparatus, a device for repeatedly presenting each of successive data in the same order, a plurality of laterally spaced data printing mechanisms each operable in successive operations to print in adjacent character positions in one direction and after a number of such operations to print in the same character positions in the reverse direction, and means for reading succeeding ones of groups of repeatedly presented data and successively conditioning the corresponding mechanisms to print the same when the mechanisms are printing in the one direction and for reading preceding ones of groups of repeatedly presented successive data and successively conditioning mechanisms to print the same when the mechanisms are printing adjacent character positions in the reverse direction.

3. In an apparatus, a device for repeatedly presenting each of successive data in the same order, a cyclically operated mechanism for successively printing data first in one direction and then in the reverse direction, and means controlled by said mechanism for reading succeeding ones of the repeatedly presented data and successively conditioning the mechanism to print the same when printing in one direction and for reading preceding ones of repeatedly presented successive data to print the same when printing in the reverse direction.

4. In an apparatus, a device for storing data and repeatedly presenting the same, a cyclically operated mechanism for successively printing data first in one direction and then in the reverse direction, means controlled by said mechanism for reading succeeding ones of repeatedly presented data and successively conditioning the mechanism to print the same when printing in one direction and for reading preceding ones of repeatedly presented data and successively conditioning the mechanism to print the same when printing in the reverse direction, and means controlled by said mechanism for storing new information on said device after each of a number of successive conditionings of said mechanism.

5. In an apparatus, a continuously rotatable magnetic drum track on which digits designated by a combination of one or more bits may be serially stored, a plurality of laterally spaced mechanisms each operable in successive operations to print adjacent character positions, and means for reading the bits of succeeding ones of succeeding groups of digits on said track after succeeding operations of said mechanisms and conditioning the respective mechanisms to print the same.

6. In an apparatus, a continuously rotatable magnetic drum track on which digits designated by a combination of one or more bits may be serially stored, a plurality of laterally spaced mechanisms each operable in a number of successive operations to print adjacent character positions in one direction and then in a number of successive operations to print adjacent character positions in the reverse direction, and means for reading the bits of succeeding ones of succeeding groups of digits on said track when said mechanisms are printing in one direction to successively condition the respective mechanisms to print the same and for reading the bits of preceding ones of succeeding groups of digits on said track when said mechanisms are printing in the reverse direction to successively condition the respective mechanisms to print the same.

7. In an apparatus, a continuously rotatable magnetic drum track on which bit designated digits may be stored serially by bit and digit, a plurality of print mechanisms each operable to print a corresponding group of adjacent character positions in succeeding operations and including a magnet for each possible bit in the code employed, a bank of thyratrons each having a first grid and a second grid for the magnets of each mechanism, means operable to distribute the bits of each succeeding digit to the first grid of the corresponding orders of thyratrons, and means synchronized with the drum rotation for conditioning the second grids of different banks of thyratrons when particular digit bits are being distributed.

8. In an apparatus, a device for repeatedly presenting data in the same order, a plurality of laterally spaced data mechanisms each operable in successive operations to print in adjacent character positions, and means for reading different ones of spaced groups of data repeatedly presented by said device and successively conditioning the corresponding mechanisms to print the same in successive operations.

References Cited in the file of this patent

UNITED STATES PATENTS

| | | |
|---|---|---|
| 950,473 | Campbell | Mar. 1, 1910 |
| 996,993 | McCall | July 4, 1911 |
| 1,506,382 | Pierce | Aug. 26, 1924 |
| 1,731,614 | Etherton | Oct. 15, 1929 |
| 1,932,914 | Shelton | Oct. 31, 1933 |
| 1,975,791 | Hopkins | Oct. 9, 1934 |
| 2,010,652 | Tauschek | Aug. 6, 1935 |
| 2,138,627 | Daly | Nov. 29, 1938 |
| 2,138,649 | Weinlich | Nov. 29, 1938 |
| 2,278,118 | Pitman | Mar. 31, 1942 |
| 2,398,036 | Paris | Apr. 9, 1946 |
| 2,464,608 | Rabenda | Mar. 15, 1949 |
| 2,578,771 | Zint | Dec. 18, 1951 |
| 2,681,614 | Rast | June 22, 1954 |
| 2,683,410 | Wockenfuss | July 13, 1954 |
| 2,692,551 | Potter | Oct. 26, 1954 |
| 2,694,362 | Paige | Nov. 16, 1954 |
| 2,728,289 | Johnson | Dec. 27, 1955 |
| 2,831,424 | MacDonald | Apr. 22, 1958 |